Figures 1, 2:
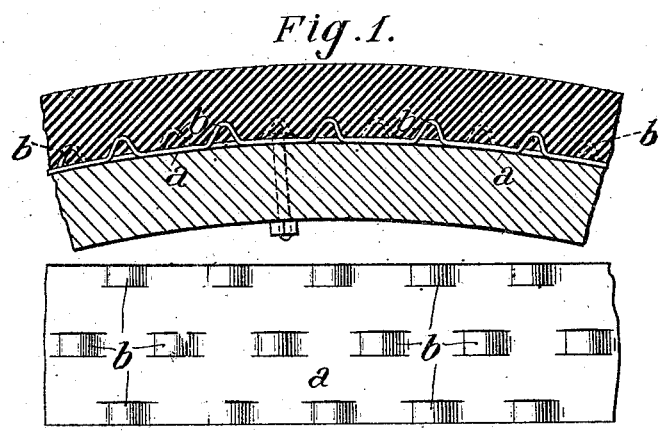

E. B. MÉRIGOUX.
RESILIENT TIRE.
APPLICATION FILED APR. 15, 1908.

949,001.

Patented Feb. 15, 1910.

Witnesses:—
C. H. Crawford
E. Schallinger

Inventor:—
Emile Baptiste Mérigoux
by B. Singer
Attorney

UNITED STATES PATENT OFFICE.

EMILE BAPTISTE MÉRIGOUX, OF PARIS, FRANCE.

RESILIENT TIRE.

949,001.  Specification of Letters Patent.  Patented Feb. 15, 1910.

Application filed April 15, 1908. Serial No. 427,134.

*To all whom it may concern:*

Be it known that I, EMILE BAPTISTE MÉRIGOUX, a citizen of the Republic of France, residing at Paris, in France, have invented new and useful Improvements in Resilient Tires, of which the following is a specification.

This invention relates to improvements in resilient tires comprising resilient elements and metallic elements.

The said improvements relate particularly to the method of connecting the resilient elements with the metallic elements by which they are connected to the felly of the wheel.

In the annexed drawing an example of construction of the improvements is shown in which—

Figure 1 is a longitudinal sectional view of the tire and felly showing the strip or metallic element in elevation. Fig. 2 is a plan view of the strip or metallic element detached.

It is of importance to form the metallic element in such a manner that it has sunk portions or cavities which, when the molding is done, the hard rubber fills up, so that said hard rubber becomes intimately connected to the metallic element.

In Fig. 1, the metallic element is formed of a metal sheet or plate $a$ curved to the curve of the felly of the wheel and is of more or less length at least equal to the length of the elastic element which it is to receive; this sheet is cut and punched out at intervals so as to form a series of bridges $b$ preferably arranged in staggered relation on the surface of the plate $a$, as shown in Fig. 2. The india-rubber element is molded on the plate on that side on which are the projecting bridges $b$, as shown in Fig. 1. When molding the rubber penetrates beneath the bridges $b$ and the metallic element is consequently intimately connected with the rubber element.

I claim—

1. A rubber tire attaching device comprising an element adapted to be partly embedded in and to lie against the inner periphery of the tire and provided with a plurality of looped portions providing horizontal and vertically disposed openings for entrance of the rubber.

2. A rubber tire attaching device comprising an element adapted to be embedded in and lie against the inner periphery of the tire and providing a metal strip provided with integrally formed looped portions longitudinally disposed with respect to the strip and affording horizontal and vertically disposed openings for entrance of the rubber.

3. A rubber tire attaching device comprising a metallic strip adapted to be embedded in and lying against the inner periphery of the tire and provided with a plurality of rows of integrally formed outwardly projecting loops, the loops of adjacent rows being arranged in staggered relation, the formation of said loops providing horizontal and vertically disposed openings for entrance of the rubber.

In testimony whereof I affix my signature in presence of two witnesses.

EMILE BAPTISTE MÉRIGOUX.

Witnesses:
 JULIEN EAUENS,
 H. C. COXE.